United States Patent Office 3,440,856
Patented Apr. 29, 1969

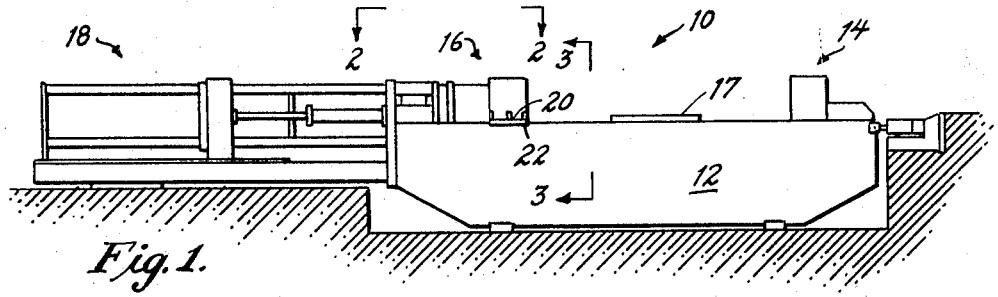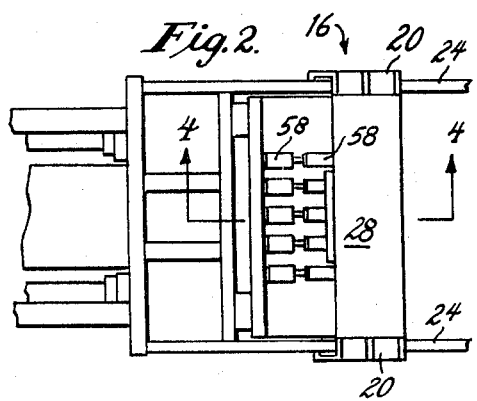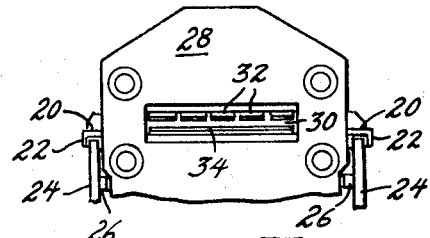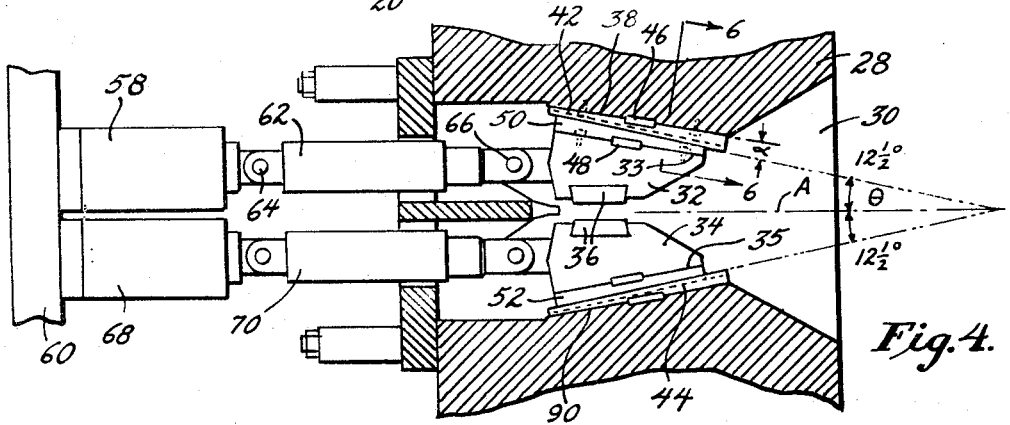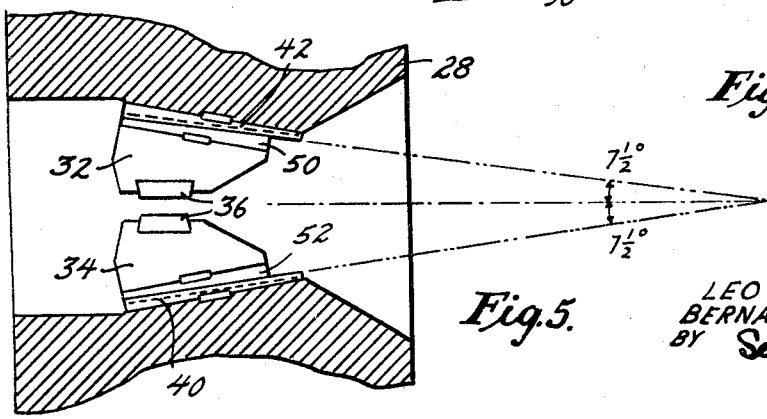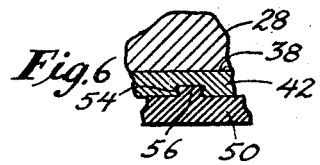
INVENTORS.
LEO HOFFMANN
BERNARD KLAVERKAMP
BY Seidel & Gonda
ATTORNEYS.

---

3,440,856
GRIPPING DEVICE WITH VARIABLE
WEDGE ANGLE
Leo Hoffmann, Ridley Park, and Bernard Klaverkamp,
Wallingford, Pa., assignors to Baldwin-Lima-Hamilton
Corporation, Philadelphia, Pa., a corporation of
Delaware
Filed Apr. 25, 1967, Ser. No. 633,541
Int. Cl. B21d 11/02; B21j 13/08
U.S. Cl. 72—302                                   9 Claims

ABSTRACT OF THE DISCLOSURE

A gripping device for use in a stretch-straightener wherein wedge-shaped wear plates are disposed between opposed surface portions of a gripper head and work piece gripper jaws. The orientation of the wear plates with respect to each other and with respect to the opposed surface portions may be reversed, thereby providing for adjustment of the wedge angle of the jaws.

---

This invention relates to a gripping device in a stretch-straightener, and more particularly, to a wedge type gripping device having a variable wedge angle.

It is well known that metal plates or other shapes, which have become warped or bent in processing or handling, may be straightened by stretching them beyond their elastic limit. To accomplish such stretching, numerous solutions have heretofore been proposed. Exemplary of these is U.S. Patent No. 2,908,316, assigned to the assignee of the present application.

An essential part of any stretch-straightener is the gripping device whereby the work piece, which may be a plate or other shape, is held during stretching. It has been proposed that serrated jaws or jaw inserts be used with the gripping device to securely grip the work piece. Certain materials and shapes, however, due to their physical and mechanical properties, cannot be securely held by serrated jaws.

Accordingly, it is an object of this invention to provide a means for securely gripping work pieces which do not permit utilization of serrated jaw inserts.

It is another object of this invention to provide a novel gripping device having a variable wedge angle, and accordingly, variable gripping pressure.

It is another object of this invention to provide a novel gripping device for use with stretch-straighteners or the like.

It is still another object of this invention to provide a gripping device for use with stretch-straighteners wherein the wedge angle may be altered by re-arrangement of tapered wear plates.

Other objects will appear hereinafter.

The present invention may be embodied in a structure wherein a gripping head is provided with a pair of tapered surfaces, and a tapered wear plate is secured to the gripping head. Work-piece-gripping jaws, which themselves include wear surfaces slide relative to the wear plates, thereby moving toward and away from each other.

For the purpose of illustrating the invention there is shown in the drawings a form which is presently preferred; it being understood, however, that this invention is not limited to the precise arrangements and instrumentalities shown.

FIGURE 1 is a side elevational view of a stretch-straightening machine in accordance with the principles of the present invention.

FIGURE 2 is a partial top plan view taken along the line 2—2 in FIGURE 1.

FIGURE 3 is a partial elevation view taken along the line 3—3 in FIGURE 1.

FIGURE 4 is a partial cross-sectional view in elevation, taken along the line 4—4 in FIGURE 2.

FIGURE 5 is a view showing a portion of the structure of FIGURE 4, with the wear plates adjusted to change the wedge angle.

FIGURE 6 is a detailed cross-sectional view taken along the line 6—6 in FIGURE 4, and showing the manner in which a wear plate may be associated with the gripper head, and a gripper jaw.

Referring now to the drawings in detail, wherein like numerals indicate like elements, there is seen in FIGURE 1 a stretch-straightening apparatus designed generally by the reference numeral 10.

The stretch-straightening apparatus 10 includes a frame 12. Supported on frame 12 is a pair of spaced gripper head assemblies 14 and 16, which are adapted to grip opposite ends of a work piece. Stretching of a work piece, not shown, is accomplished by moving the gripper head assembly 16 linearly away from the gripper head assembly 14. A medial portion of the work piece may be supported by a camelback 17 on the frame 12, if desired. The hydraulic apparatus 18, which per se, forms no part of the present invention, is coupled to the gripper head assembly 16 and provides the above-mentioned linear movement.

Referring now to FIGURES 2 and 3 there is seen the manner in which the gripper head assembly 16 is mounted on the frame 12. Thus, the gripping head assembly 16 includes laterally extending flanges 20, which have downturned ends 22. The frame 12 includes upstanding portions 24, and guide strips 26 integral with the upstanding portions. The flanges 20 overlie and ride upon upper edges of the upstanding portions 24. Suitable bearings, not shown, may be provided between the flanges and the upstanding portions. The guide strips 26 provide lateral support for the gripper head assembly 16 and prevent it from canting with respect to the frame 12. Suitable bearing means may also be provided between the guide strips 26 and the gripper head assembly 16.

As is perhaps most clearly seen in FIGURE 3, the gripper head assembly 16 includes a face plate 28. The face plate 28 includes an opening 30, within which are disposed a wide lower jaw 34, and a series of narrower upper jaws 32 in side-by-side disposition. Alternatively, the lower jaw 34 may also be a series of narrower jaws. The jaws 32 and 34 are provided with hardened replaceable inserts 36 for contacting the work piece, and include rear surfaces 33 and 35.

Referring now to FIGURE 4, there is seen a particular novel aspect of the present invention.

The face plate 28 includes juxtaposed surfaces 38 and 40, angularly disposed with respect to a plane, designated in FIGURE 4 by the letter A, including a longitudinal axis of a work piece to be straightened. The plane surfaces 38 and 40 are therefore converging, and include corresponding first and second edge portions, the first edge portions being more closely spaced than the second. Wear plates 42 and 44 are removably secured in abutment with surfaces 38 and 40, respectively. The wear plates 42 and 44 may be secured by means of bolts, shown in dotted line in FIGURE 4, supplemented by keys 46 and 48. As is apparent from the drawing, the wear plates have converging opposite faces defining longitudinal cross-sections tapering from a first thinner end to a second thicker end. The angle $\alpha$ defined by the opposite faces of the wear plates is less than one-half the angle defined by the juxtaposed converging surfaces 38 and 40.

Tapering wear plates 50 and 52 are secured to the gripper jaws 32 and 34 in a like manner. The wear plates 50 and 52, secured to gripper jaws, and the wear plates 42 and 44, secured to the opposing surfaces 38 and 40, are themselves in surface-to-surface contact. As is best seen in FIGURE 6, a dovetail groove 54 is provided in the wear plate 42, and the wear plate 50 includes a complemental tongue 56. Thus, the adjacent wear plates may slide relative to each other, but are held in surface contact by the tongue 56 and the groove 54. The locations of the tongue 56 and the groove 54 can, of course, be reversed. The wear plates 44 and 52 are provided with a similar tongue and groove connection.

The degree of taper of the pairs of wear plates 42, 50 and 44, 52 may be the same, or may, for a purpose to be apparent later, be dissimilar.

In order to grip a work piece, the gripper jaws 32 and 34 are moved, by mechanism to be described in detail later, to the right in FIGURE 4. In being so moved, the gripper jaws 32 and 34 converge at an angle defined by the angle between the surfaces of the wear plates 42 and 44 abutted by the wear plates 50 and 52.

The angle of convergence of the gripper jaws may readily be altered by merely rotating the wear plates to reverse their orientation with respect to the face plate 28. Thus, in FIGURE 5, the thicker end of the wear plate 50 and the thinner end of the wear plate 42 are adjacent the more closely spaced edges of the surfaces 38 and 40. The effect of such reversal is to change the angle at which the gripper jaws 32 and 34 approach each other. It should be apparent that three different gripping wedge angles can be obtained with one set of wear plates. Hence, the wear plates may be arranged as shown in FIGURE 4 to obtain a first wedge angle; or they may be reversed as shown in FIGURE 5, thereby obtaining a second wedging angle; or, if desired, one of the pairs of wear plates may be disposed as shown in FIGURE 4, and the other as in FIGURE 5, thereby obtaining an intermediate angle.

The specific wedging angles to be used are a matter of design. By way of example, there is shown in FIGURES 4 and 6, an arrangement of wear plates capable of obtaining wedging angles of 25°, 15°, or 20°.

For the purpose of discussion, the angle $\theta$, in FIGURE 4, henceforth referred to as the "half-angle," is 12½°, and the overall angle of approach of the gripper jaws to each other is 25°. The wear plates in the illustrated embodiment each taper at an identical angle $\alpha$, which is equal to 2½°. By reversing the wear plates as shown in FIGURE 5, the "half-angle" is decreased by 5° to equal 7½°. Thus, the angle of approach of the gripper jaws 32 and 34 is 15°. It should be apparent that by reversing only one pair of wear plates, a half-angle of 7½° can be obtained for one of the jaws, while a half-angle of 12½° remains for the other.

Those skilled in the art will appreciate that by using wear plates having different degrees of taper, a further variation may be obtained.

Referring now to FIGURES 2 and 4, there is shown the means whereby gripper jaws 32 and 34 are actuated to their work piece gripping positions. The upper gripper jaws 32, as is evident from FIGURE 3, are relatively narrow individual members, each capable of movement independently of the others. The lower gripper jaw 34 is a single member, extending the width of the opening 30. The foregoing arrangement permits gripping of relatively narrow work pieces, as well as wide work pieces having irregular transverse cross-sections. The upper gripper jaws 34 may be actuated by individual actuators 58. The actuators 58 are mounted on a fixed portion 60 of the gripper head assembly, and transmit motion to the gripper jaws 32 through resilient damper links 62. Damper links 62 are provided with pin connections 64 and 66 at each end.

The gripper jaw 34 may be moved by a pair of spaced actuators 68, one of which is seen in FIGURE 4, acting through damper links 70.

The respective actuators and damper links, per se, form not part of the present invention.

The present invention constitutes an advance in the art in that it provides for a variable wedging angle which can be readily adapted to the requirements of the materials to be stretched and straightened.

The present invention may be embodied in other specific forms without departing from the spirit or essential attributes thereof and, accordingly, references should be made to the appended claims, rather than to the foregoing specification as indicating the scope of the invention.

We claim:

1. In a stretch-straightener including a pair of opposed gripper head assemblies, at least one of said gripper head assemblies being movable away from the other to stretch a work piece, work piece gripping apparatus on at least one of said assemblies comprising a pair of juxtaposed converging surfaces having corresponding first and second edge portions, said first edge portions being more closely spaced than said second edge portions, a pair of jaws on said one assembly for gripping a work piece, first wear plates coupled to said jaws, said wear plates having converging opposite faces defining a longitudinal cross-section tapering from a first thinner end to a second thicker end, second wear plates coupled to said converging surfaces and having converging opposite faces defining a longitudinal cross-section tapering from a first thinner end to a second thicker end, said first and second wear plates having abutting faces whereby they are adapted to slide relative to each other, said first and second wear plates being removably secured to said jaws and said converging surfaces respectively, so that said wear plates can be repositioned to provide different angles of approach for said jaws, and means coupled to said jaws and a fixed portion of said one assembly to slide said jaws and said second wear plates relative to said converging surfaces and said first wear plates.

2. In a stretch-straightener in accordance with claim 1, the thicker ends of said first wear plates being disposed adjacent the thinner ends of said second wear plates.

3. In a stretch-straightener in accordance with claim 1, the thicker ends of said first wear plates being disposed adjacent the first edge portions of said converging surfaces on said gripper head.

4. In a stretch-straightener in accordance with claim 1, said opposite faces of said wear plates defining an included angle therebetween less than one-half the included angle defined by said juxtaposed converging surfaces.

5. A stretch-straightener including a frame, a pair of opposed gripper heads disposed on said frame, means coupled to said frame for moving at least one of said gripper head assemblies away from the other to stretch a work piece, work piece gripping apparatus on said gripper heads comprising a pair of juxtaposed converging surfaces, said converging surfaces having first and second edge portions, said first edge portions being more closely spaced than said second edge portions, a pair of jaws for gripping a work piece and having rear surfaces thereon, wear plates removably disposed between said converging surfaces and said rear surfaces on said jaws, said jaws being slidable at an angle defined by surfaces of said wear plates to a work piece gripping position, said wear plates having converging opposite faces defining a longitudinal cross-section tapering uniformly from a first thinner end to a second thicker end so that reversal of said wear plates with respect to the respective edge portions of said juxtaposed converging surfaces is effective to change the angle at which said jaws approach the work piece gripping position, and means coupled to said jaws and a fixed portion of said gripper head for sliding said jaws to a work piece gripping position.

6. A stretch-straightener in accordance with claim 5, wherein said means for sliding said jaws to a work piece gripping position comprises hydraulic actuators, and resilient shock absorbing links between said actuators and said jaws.

7. A stretch-straightener in accordance with claim 6, wherein said opposite faces of said wear plates define an included angle therebetween less than one-half the included angle defined by said juxtaposed converging surfaces.

8. A work piece gripping device for use in a stretch-straightener, said gripping device comprising a pair of juxtaposed converging surfaces having first and second edge portions, said first edge portions being more closely spaced than said second edge portions, a pair of jaws for gripping, a work piece and having a rear surfaces thereon, wear plates removably disposed between said converging surfaces and said rear surfaces on said jaws, said jaws being slidable at an angle defined by faces of said wear plates to a work piece gripping position, said wear plates having converging opposite faces defining a longitudinal cross-section tapering uniformly from a first thinner end to a second thicker end so that reversal of said wear plates with respect to the respective edge portions of said juxtaposed converging surfaces is effective to change the angle at which said jaws approach the work piece gripping position, and means coupled to said jaws for sliding them to the work piece gripping position.

9. A work piece gripping device in accordance with claim 8 wherein said opposite faces of said wear plates define an included angle therebetween less than one-half the included angle defined by said juxtaposed converging.

References Cited
UNITED STATES PATENTS

| | | | |
|---|---|---|---|
| 2,279,964 | 4/1942 | Berliner | 72—297 |
| 2,961,028 | 11/1960 | Bath | 72—297 |
| 3,314,270 | 4/1967 | Dolney | 72—302 |

RONALD D. GREFE, *Primary Examiner.*

U.S. Cl. X.R.

72—305, 457